June 29, 1943.   O. E. FISHBURN   2,322,840
CLUTCHING MECHANISM
Filed April 28, 1941
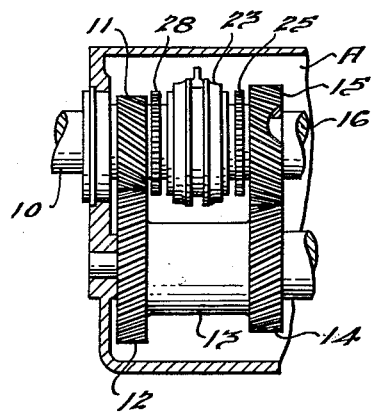
INVENTOR
Otto E. Fishburn.
BY
Harness, Dicke, Pate & Harris
ATTORNEYS.

Patented June 29, 1943

2,322,840

UNITED STATES PATENT OFFICE 2,322,840

CLUTCHING MECHANISM

Otto E. Fishburn, Detroit, Mich., assignor to Chrysler Corporation, Highland Park, Mich., a corporation of Delaware Application April 28, 1941, Serial No. 390,646

16 Claims. (Cl. 192—53)

This invention relates to a clutching mechanism and more particularly to improvements in the control therefor.

An object of the invention is the provision in a mechanism of the foregoing type of improved means operable to prevent or block clutching action when the structures to be clutched are operating at different speeds and which will accommodate clutching together of such structures when the speeds of rotation of the latter are approximately the same.

A still further object of the invention is to provide means of the foregoing type which is adapted to effect approximate synchronization of the speeds of rotation of the structures to be clutched together prior to accommodating clutching thereof.

Another object of the invention is to provide improved means for actuating the blocker-synchronizer whereby a maximum synchronizing action is effected with a minimum effort on behalf of the vehicle operator when the clutch mechanism is operated under control of the latter. More particularly the invention provides control means for a clutch mechanism, wherein a cam and a cooperating part are in rolling contact.

In carrying out the foregoing objects of the invention there is provided a roller engageable with the blocker-synchronizer, this arrangement reducing the effort necessary to actuate the latter. The blocker-synchronizer is preferably provided with a surface so shaped that when engaged under pressure by the roller, the latter simultaneously exerts components of force directed respectively axially and circumferentially with respect to the blocker-synchronizer. This action tends to rotate the latter as it is moved axially into frictional engagement with its cooperating friction surface.

Another object of the invention is to so arrange the blocker-synchronizer and cooperating roller that the former presents a substantial surface area for engagement by the latter to thereby initiate early frictional engagement between the blocker-synchronizer and its cooperating friction surface thereby insuring the desired synchronization of the parts to be clutched prior to clutching thereof.

Further objects and advantages of the invention will be more apparent from the following detail description taken in connection with the accompanying drawing in which:

Fig. 1 is an elevational view, partly in section, of a portion of a transmission with my invention applied thereto.

Fig. 2 is an enlarged longitudinal sectional view of the transmission shown in Fig. 1.

Fig. 3 is a transverse sectional view taken on line 3—3 of Fig. 2.

Fig. 4 is a fragmentary top plan view taken as indicated by the line 4—4 of Fig. 2.

Fig. 5 is a view similar to Fig. 4 but showing a modified form of the invention.

In the drawing I have illustrated the invention in connection with the second and third speed drives of a conventional transmission A although the blocker synchronizer can be used wherever blocker clutching is desired.

The transmission A comprises the usual driving shaft 10 carrying the main drive pinion 11 meshing with countershaft gear 12. The countershaft 13 carries a gear 14 meshing with the second speed gear 15 which is loose on the transmission output shaft 16.

Splined at 17 to shaft 16 and fixed by gear 15 and ring 18 against movement axially of this shaft is a hub 19 having a plurality of circumferentially spaced rim segments 20 herein illustrated as three in number, which extend axially beyond the body portion of the hub, each segment being formed with a series of axially extending teeth 21 engaged by the internal teeth 22 of a shift clutch member or sleeve 23, as more particularly shown in Fig. 3.

The gear 15 has a forwardly extending portion 24 formed with a series of external clutching teeth 25 and a friction clutching cone surface 26. Gear 11 likewise has a rear extension 27 formed with a series of external clutching teeth 28 and a friction clutching cone surface 29, the sleeve teeth 22 being selectively engageable either with teeth 25 or 28 when the sleeve 23 is shifted rearwardly or forwardly to respectively drive shaft 16 from shaft 10 in the second or direct speed ratios.

As a means for preventing positive clutching of the teeth of the sleeve 23 with teeth 25 or 28 prior to approximate synchronization of the hub 19 with the gear 15 or the gear 11, I provide a pair of blocker synchronizers in the form of rings 30 similar in construction and function.

Each of the rings 30 has a plurality of circumferentially spaced pairs of axially extending lugs, herein illustrated as three in number, which extend respectively into the space between adjacent rim segments 20, one of such pairs being illustrated more particularly in Fig. 4 and comprising spaced lugs 31 and 32. Each ring 30 has a portion of the radially outer periphery thereof cut away as indicated at 33 intermediate the circumferentially spaced pairs of lugs to accommodate an axial overlap of the rings and the hub segments 20, and providing a shoulder 34. In operation, as hereinafter set forth, the shoulder 34 of each ring is spaced axially from the adjacent extremity of the hub segments 20, it being understood that such spacing provides a tolerance in manufacture and assembly.

The free end face 35 of each lug 31, 32 is tapered so that the faces of each pair of lugs converge toward a spacing, indicated at 36, between the lugs 31, 32 of each pair thereof, the spacing 36 being provided in the radially outer periphery of the ring, similar to the portion cut away at 33.

Each ring 30 is formed with a cup 37 preferably threaded to provide a friction surface which will cut through the oil film at the cones 26, 29 without grooving the cones, the threads preferably being of a left hand to assist in the release of the rings after they have performed their functions. Inasmuch as the construction and operation of the blocker synchronizer rings 30 are the same, the following description taken in connection with the rearwardly disposed ring 30 and gear 15 is typical. The latter ring is mounted on the extension 24 of the gear 15, and prior to shift of sleeve 23 rearwardly, the blocker friction surface at threads 37 has slight clearance with the cone 26 approximately the same as a normal good running bearing fit. Such a fit is usually in the neighborhood of .002 of an inch such as would be provided at gear 15 on shaft 16. Under such conditions the ring 30 will be rotatably dragged with gear 15, the lugs 31, 32 striking a segment 20. In this manner the rings are permitted to rotate relative to the hub 19, so that the lugs have a blocking position when disposed against the stops provided by the segments, this blocking position being illustrated in Fig. 4. It will be understood that each blocker synchronizer ring 30 has its sole support on the member 24 or 27 which rotates it into blocking position and when in said blocking position the lugs 31, 32 prevent shift of the sleeve 23 until the speed of rotation of the ]·· approximates the speed of rotation of the gear 11 or 15 with which it is to be positively clutched. When these speeds are thus approximate, the ring 30 rotates to a non-blocking position, this action being accommodated by the clearance between the pair of lugs and the adjacent rim segments 20.

In the form of the invention herein illustrated the rings 30 are adapted to exert a combined blocking and synchronizing action and for this purpose each is adapted to be moved axially away from the hub 19 whereby the surface 37 is frictionally forced against the surface 26 or 29.

In effecting both the blocking and the synchronizing function each pair of lugs has cooperatively associated therewith a roller 38 rotatably supported by a pin 39 threaded into the sleeve 23. Three such rollers 38 are employed which extend radially inwardly beyond the extremity of the teeth 22, one such roller being disposed centrally in the space between adjacent rim segments 20, as illustrated in Fig. 3. When the rings are rotated, as heretofore set forth, to the blocking position as illustrated in Fig. 4, the lugs are positioned to block axial movement of the sleeve 23 and clutching of the teeth 22 thereof with the teeth 25 or 38, and upon axial movement of the sleeve 23 to clutch with either of the latter teeth the rollers 38 are moved against the tapered face 35 of the blocking lug. This movement, in shifting the sleeve 23, imparts a combined axial and circumferential thrust to the ring 30 thereby effecting a synchronizing pressure at friction surfaces 37, 26 when the sleeve is shifted rearwardly and at 37, 29 when the latter is shifted forwardly. The synchronization is, practically speaking, almost instantaneous, whereupon the rollers enter the space 36, the sleeve teeth passing radially outwardly of the lugs and engaging teeth 75 or 28 without clashing or damaging the teeth.

Provision of the rollers 38 for engagement with the cam faces 35 eliminates the frictional resistance such as would result from an arrangement where these parts merely slide one against the other and in this manner the effort required to shift is substantially minimized. The extent of the surface of the cam faces 35 makes possible the application of a synchronizing force over a greater time period than heretofore possible resulting in a more effective synchronizing producing force which is so applied as to eliminate the harshness and suddenness of the action where the synchronizing force is applied in a relatively short time period due to the relatively small area of the contacting surface of the blocking part. While the rollers 38 maintain a slight clearance with the cam faces 35 when the sleeve is in neutral position, this clearance is taken up on initial movement of the sleeve and the rollers engage a substantial portion of the contacting cam face in effecting clutching shift thereof.

In the form of the invention illustrated in Fig. 5 the parts and the function thereof are the same as in the previous embodiment and have been similarly identified. However, in the Fig. 5 embodiment the lugs 31 and 32 of each pair thereof and the associated roller 38 are so arranged that the lugs will engage the latter when the block synchronizer rings are rotated to their blocking position, thus insuring that these rings will assume their illustrated position wherein they are spaced from the adjacent extremity of the rim segment 20.

Although but two embodiments of this invention have herein been shown and described, it will be understood that various changes in the size, shape and arrangement of parts may be made without departing from the spirit of the invention or from the scope of the appended claims.

I claim:

1. In a power transmitting mechanism including driving and driven structures adapted to be positively clutched; one of said structures having a set of clutch teeth and a friction surface, a clutching sleeve drivingly carried by the other of said structures and shiftable axially to clutch with said teeth, a blocker member mounted on said friction surface and including blocker means forming a rotatable connection between said other structure and said member, said connection accommodating limited rotation of said blocker member relative to said other structure for accommodating positioning of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and a roller carried by said clutching sleeve and engageable with said blocker means for thrusting said blocker member into frictional engagement with said friction surface to effect approximate synchronization of said structures prior to clutching of said sleeve and teeth.

2. In a power transmitting mechanism including driving and driven structures adapted to be positively clutched; one of said structures having a set of clutch teeth and a friction surface, a clutching sleeve drivingly carried by the other of said structures and shiftable axially to clutch with said teeth, a blocker member mounted on said friction surface and including blocker means forming a rotatable connection between said other structures and said member, said connection accommodating limited rotation of said blocker member relative to said other structure for accommodating positioning of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and a roller engageable with said blocker means in response to shift of said sleeve for thrusting said blocker member into frictional engagement with said friction surface to thereby effect approximate synchronization of said structures prior to clutching of said sleeve and teeth.

3. In a power transmitting mechanism including driving and driven structures adapted to be positively clutched; one of said structures having a set of clutch teeth and a friction surface, an internally toothed clutching sleeve drivingly carried by the other of said structures and shiftable axially to clutch with said set of teeth, a roller carried by said sleeve and disposed radially inwardly with respect to the teeth thereof, a blocker member mounted on said friction surface including blocker means freely accommodating passage of said sleeve teeth radially outwardly thereof and engageable by said roller in response to axial shift of said sleeve whereby to force said blocker member into frictional engagement with said friction surface to effect approximate synchronization of said structures prior to clutching of said sleeve teeth with said set of teeth, said blocker means forming a rotatable connection between said other structure and said member, said connection accommodating limited rotation of said blocker member relative to said other structure for accommodating positioning of said blocking means in blocking relationship with respect to said roller when said structures are rotating at relatively different speeds and for disposing said blocker means out of said blocking relationship thereby to accommodate shift of said clutching sleeve as aforesaid when said structures are rotating at approximately the same speed.

4. In a power transmitting mechanism including driving and driven structures adapted to be positively clutched; one of said structures having a set of clutch teeth and a friction surface, an internally toothed clutching sleeve drivingly carried by the other of said structures and shiftable axially to clutch with said set of teeth, a roller carried by said sleeve and disposed radially inwardly with respect to the teeth thereof, a blocker member mounted on and engageable with said friction surface to vary the relative speeds of rotation of said structures and comprising blocker means including a pair of spaced lugs freely accommodating passage of said sleeve teeth radially outwardly thereof and having tapered end faces converging one toward the other, said lugs having a driving connection with said other structure accommodating movement thereof to a position whereby one of said end faces is aligned with said roller when said structures are rotating at relatively different speeds and for disposing said end face out of said alignment when said structures are rotating at approximately the same speed, said one of said end faces being engageable by said roller in response to shift of said sleeve to force said blocker member into frictional engagement with said friction surface as aforesaid and to move said end face out of alignment with said roller whereby to accommodate clutching engagement of said sleeve teeth and said set of clutch teeth when said structures are rotating at approximately the same speed.

5. In a clutching device, a first rotatable structure having clutching teeth and a friction surface, a second rotatable structure, a blocker member having a friction surface engageable with the aforesaid friction surface under relatively heavy pressure to vary the relative speeds of said structures and having blocker means, means for driving said blocker member from said second structure and accommodating limited rotation of the blocker member relative to said second structure, a toothed sleeve driven with said second structure and shiftable to clutchingly engage with the teeth of said first structure, and a roller engageable with said blocker means in response to shift of said sleeve as aforesaid for placing said friction surfaces under said relatively heavy pressure prior to said clutching engagement.

6. In a clutching device, a first rotatable structure having clutching teeth and a friction surface, a second rotatable structure, a blocker member having a friction surface engageable with the aforesaid friction surface under relatively heavy pressure to vary the relative speeds of said structures, said blocker member having blocking portion provided with a tapered surface, means for driving said blocker member from said second structure and accommodating limited rotation of the blocker member relative to said second structure, a toothed sleeve driven with said second structure and shiftable to clutchingly engage with the teeth of said first structure, and a roller rotatably carried by said sleeve engageable with the tapered surface of said blocker portion in response to shift of said sleeve as aforesaid for placing said friction surfaces under said relatively heavy pressure prior to said clutching engagement.

7. In a clutching device of the character described a first rotatable structure having clutching teeth and a friction surface, a second rotatable structure, a blocker member mounted on and engageable with said friction surface under relatively heavy pressure to vary the relative speeds of said structures and having blocking means including a pair of spaced lug-like elements having tapered face portions converging one toward the other, said member having a driving connection with said second structure accommodating movement of said member relative to said second structures between fixed limits when said structures are rotating at relatively different speeds whereby said lug-like elements are respectively disposed in blocking position when said member is at said fixed limits, a toothed sleeve driven with said second structure and shiftable to clutchingly engage with the teeth of said first structure, and a roller carried by said sleeve and engageable with the face portion of that element disposed in said blocking position in response to shift of said sleeve as aforesaid for establishing said relatively heavy pressure prior to said clutching engagement, said connection accommodating disposition of the lug engaged as aforesaid out of said blocking position.

8. In a clutching device, a first rotatable structure having clutch teeth and a friction surface, a second rotatable structure, a toothed sleeve driven with said second structure and shiftable to clutchingly engage with the teeth of said first structure, a member rotatable relative to and having a friction surface engageable with the aforesaid friction surface to vary the relative speeds of said structures, and a member having rolling contact engagement with said rotatable member in response to said shift of said sleeve for engaging said friction surfaces as aforesaid prior to said clutching engagement.

9. In a clutching device, a first rotatable structure having clutch teeth and a friction surface, a second rotatable structure, a toothed sleeve driven with said second structure and shiftable to clutchingly engage with the teeth of said first structure, a member rotatable relative to and having a friction surface engageable with the aforesaid friction surface to vary the relative speeds of said structures, said member having a cam-like portion, and a roller engageable with said portion in response to said shift of said sleeve for simultaneously exerting axially and circumferentially directed thrust components against said member to thereby engage said friction surfaces as aforesaid prior to said clutching engagement.

10. In a power transmitting mechanism including driving and driven structures adapted to be positively clutched; one of said structures having a set of clutch teeth, a clutching sleeve drivingly carried by the other of said structures and shiftable axially to clutch with said teeth, blocker means having a rotatable connection with said other structure accommodating limited rotation of said blocker means relative to said other structure for accommodating positioning of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and a roller carried by said clutching sleeve and so aligned with respect to said blocker means when the latter is in its blocking relationship as aforesaid as to prevent shifting of said sleeve when said structures are rotating at relatively different speeds.

11. In a power transmitting mechanism including driving and driven structures adapted to be positively clutched; one of said structures having a set of clutch teeth, a clutching sleeve drivingly carried by the other of said structures and shiftable axially to clutch with said teeth, blocker means having a rotatable connection with said other structure accommodating limited rotation of said blocker means relative to said other structure for accommodating positioning of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, said blocker means including a cam-like portion, and a roller cooperating with said blocker means to prevent shifting of said sleeve as aforesaid when said structures are rotating at relatively different speeds, said roller operating on said cam-like portion to impart a rotationally directed thrust component to said blocker means in response to shifting of said sleeve.

12. In a power transmitting mechanism including driving and driven structures adapted to be positively clutched; one of said structures having a set of clutch teeth and a friction surface, a clutching sleeve drivingly carried by the other of said structures and shiftable axially to clutch with said teeth, a blocker member mounted on said friction surface and including blocker means, said blocker member having a rotatable connection with said other structure accommodating limited rotation of said blocker member relative to said other structure for accommodating positioning of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and a roller engageable with said blocker means in response to shift of said sleeve for thrusting said blocker member into frictional engagement with said friction surface to thereby effect approximate synchronization of said structures prior to clutching of said sleeve and teeth.

13. In a synchronizing mechanism, the combination of rotatable driving and driven structures relatively shiftable into and out of power transmitting engagement, relatively rotatable synchronizing means associated with said structures, blocker means carried by one of said synchronizing means movable to positions for respectively blocking and allowing relative shifting of said structures to effect power transmitting engagement thereof, and a part carried by one of said structures having rolling contact engagement with said blocker means in response to said power transmitting engagement shift to thereby place said synchronizing means in synchronizing engagement.

14. In a power transmitting mechanism including driving and driven structures relatively shiftable for positive torque transmitting engagement, blocking means including a first part carried by one of said structures and a second part having a lost motion driving connection with said one of said structures, said parts cooperating one with the other to block torque transmitting engagement of said structures when the latter are operating at relatively different speeds, said lost motion connection accommodating relative displacement of said parts when said structures are operating at approximately the same speed to thereby accommodate said torque transmitting engagement, one of said parts having a cam-like surface and the other of said parts including a rotatable contact surface cooperating with the first mentioned surface to block said torque transmitting engagement.

15. In a clutching device, a first rotatable structure having clutch teeth and a friction surface, a second rotatable structure, a toothed sleeve driven with said second structure and shiftable to clutchingly engage with the teeth of said first structure, a member rotatable with one of said structures having a friction surface engageable with the aforesaid friction surface to vary the relative speeds of said structures, and means including a ramp-like portion and a part having rolling contact with said portion in response to said shift of said sleeve for engaging said friction surfaces as aforesaid prior to said clutching engagement.

16. In a clutching device, driving and driven structures adapted for relative shifting into positive clutching engagement, relatively movable friction surfaces engageable to vary the relative speeds of operation of said structures, and means operable in response to said relative shifting of said structures to engage said friction surfaces as aforesaid prior to said clutching engagement, said means including cooperating parts having relative rolling contact engagement therebetween during operation thereof to engage said friction surfaces.

OTTO E. FISHBURN.

CERTIFICATE OF CORRECTION.

Patent No. 2,322,840. June 29, 1943.

OTTO E. FISHBURN.

It is hereby certified that error appears in the printed specification of the above numbered patent requiring correction as follows: Page 2, first column, line 46, after "the" second occurrence, insert --hub--; and second column, line 47, for "segment" read --segments--; and that the said Letters Patent should be read with this correction therein that the same may conform to the record of the case in the Patent Office.

Signed and sealed this 14th day of September, A. D. 1943.

(Seal)

Henry Van Arsdale,
Acting Commissioner of Patents.